United States Patent
Tsuchiya

(10) Patent No.: US 9,238,341 B2
(45) Date of Patent: Jan. 19, 2016

(54) PREFORM NECK CRYSTALLIZATION METHOD

(71) Applicant: NISSEI ASB MACHINE CO., LTD., Nagano (JP)

(72) Inventor: Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 408 days.

(21) Appl. No.: 13/685,472

(22) Filed: Nov. 26, 2012

(65) Prior Publication Data

US 2013/0087943 A1 Apr. 11, 2013

Related U.S. Application Data

(63) Continuation of application No. PCT/JP2011/061712, filed on May 23, 2011.

(30) Foreign Application Priority Data

May 28, 2010 (JP) .................................. 2010-122898

(51) Int. Cl.
| | |
|---|---|
| *B29C 71/02* | (2006.01) |
| *B29D 22/00* | (2006.01) |
| *B29C 71/00* | (2006.01) |
| *B65D 1/02* | (2006.01) |
| *B29C 49/64* | (2006.01) |
| *B29C 49/76* | (2006.01) |
| *B29C 35/02* | (2006.01) |

(52) U.S. Cl.
CPC .......... *B29D 22/003* (2013.01); *B29C 49/6409* (2013.01); *B29C 49/76* (2013.01); *B29C 71/0063* (2013.01); *B65D 1/023* (2013.01); *B29C 35/0266* (2013.01); *B29C 71/02* (2013.01); *B29K 2995/0041* (2013.01)

(58) Field of Classification Search
CPC B29D 22/003; B29C 49/064; B29C 49/6409; B29C 49/6463
See application file for complete search history.

(56) References Cited

U.S. PATENT DOCUMENTS

| | | | |
|---|---|---|---|
| 4,035,463 A * | 7/1977 | Rosenkranz et al. | 264/521 |
| 6,099,766 A | 8/2000 | Aoki et al. | |
| 2004/0016749 A1 | 1/2004 | Miyazawa | |
| 2004/0251579 A1 * | 12/2004 | Yamanaka et al. | 264/347 |

(Continued)

FOREIGN PATENT DOCUMENTS

| | | |
|---|---|---|
| CN | 1196998 A | 10/1998 |
| CN | 1471458 A | 1/2004 |

(Continued)

*Primary Examiner* — Galen Hauth
(74) *Attorney, Agent, or Firm* — David L. Hoffman; Hoffman Patent Group

(57) ABSTRACT

A neck crystallization method includes inserting a core into the neck, heating the neck using a heater group disposed along a transfer direction while rotating the preform on its axis, and transferring the preform along the transfer direction in a state in which the core is inserted into the neck, and cooling the neck of the preform in a state in which the core is inserted into the neck. The heating of the neck includes a first step that drives first heaters positioned on the upstream side in the transfer direction at a first power, and a second step that drives second heaters positioned on the downstream side of the first heaters at a second power that is lower than the first power until the temperature of the neck reaches a crystallization temperature zone.

10 Claims, 7 Drawing Sheets

(56) References Cited

U.S. PATENT DOCUMENTS

| | | |
|---|---|---|
| 2005/0150856 A1 | 7/2005 | Ozawa |
| 2006/0157896 A1* | 7/2006 | Lee et al. ............... 264/345 |
| 2008/0031993 A1 | 2/2008 | Yamanaka |

FOREIGN PATENT DOCUMENTS

| | | |
|---|---|---|
| CN | 1520353 | 8/2004 |
| JP | 60-000927 | 1/1985 |
| JP | 09-085816 | 3/1997 |
| JP | 09-504240 | 4/1997 |
| JP | 10-203551 | 8/1998 |
| JP | 11-152122 | 6/1999 |
| JP | U3064403 | 9/1999 |
| JP | 2003-011215 | 1/2003 |
| JP | 2004-026201 | 1/2004 |
| JP | 2004-131175 | 4/2004 |
| JP | 2004-131176 | 4/2004 |
| JP | 2006-239878 | 9/2006 |
| JP | 2006-297775 | 11/2006 |
| WO | WO 95/11791 | 5/1995 |
| WO | WO/03/002333 A1 | 1/2003 |

* cited by examiner

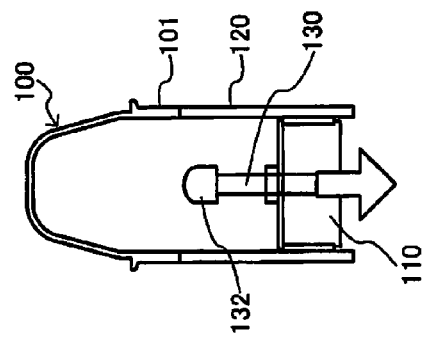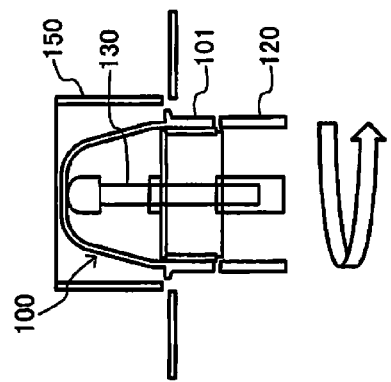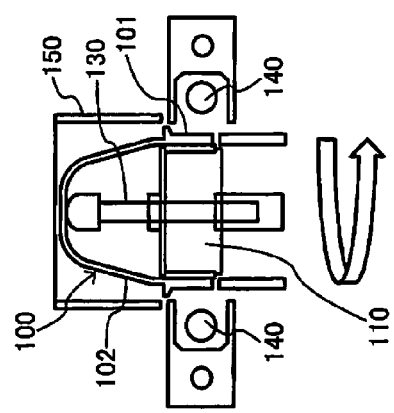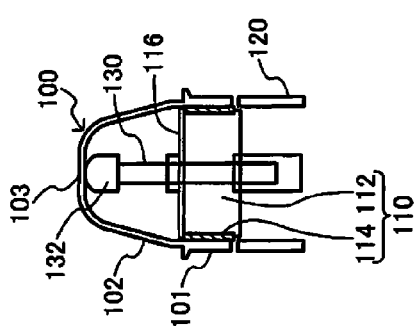

PREFORM NECK CRYSTALLIZATION METHOD

CROSS REFERENCE TO RELATED APPLICATIONS

This application is a continuation of International Patent Application No. PCT/JP2011/061712, having an international filing date of May 23, 2011, which designated the United States and which claims priority from Japanese Patent Application No. 2010-122898 filed on May 28, 2010, the entirety of both of which are incorporated herein by reference.

BACKGROUND

1. Field of the Invention

The present invention relates to a preform neck crystallization method and the like.

2. Description of the Related Art

A wide-neck (wide-mouth) container has a structure in which the ratio of the outer diameter of the neck to the outer diameter of the body is larger than that of a narrow-neck (narrow-mouth) container (e.g., polyethylene terephthalate (PET) bottle) that is widely used as a beverage container. For example, a container having a neck outer diameter of 45 mm or more is generally referred to as "wide-neck container". Since the wide-neck container allows easy removal of the contents, the wide-neck container has been used as a solid (e.g., jam) container in addition to a liquid container.

The wide-neck container normally employs a top-side seal structure (i.e., the top side of the neck is sealed using a cap). Therefore, deformation of the top side of the neck must be as small as possible in order to improve the seal-tightness.

In particular, when the wide-neck container is subjected to a high-temperature filling operation, it is necessary to crystallize the neck (i.e., increase the density of the neck) so that the neck exhibits heat resistance. When crystallizing the neck, the volume of the neck decreases along with an increase in density, so that deformation of the neck easily occurs. It is necessary to prevent a situation in which such deformation adversely affects the top side of the neck.

Japanese Utility Model Registration No. 3064403 and JP-A-2006-297775 disclose a neck crystallization method that heats the neck from the inner side and the outer side, and JP-A-11-152122, JP-A-2004-26201, and JP-A-2004-131175 disclose deformation of the neck of a narrow-neck container.

In Japanese Utility Model Registration No. 3064403 and JP-A-2006-297775, a core is inserted into the neck of a narrow-neck preform to heat the neck of the narrow-neck preform from the inner side and the outer side. In Japanese Utility Model Registration No. 3064403, a second heat source (22) that heats a thermal conductor (21) that is part of a core that extends outward from the neck is provided in addition to a first heat source (12) that heats the neck from the outer side, and heat from the second heat source (22) is transmitted to the core to heat the neck from the inner side (see FIG. 7). In JP-A-2006-297775, the second heat source (22) disclosed in Japanese Utility Model Registration No. 3064403 is omitted, and the thermal conductor (21) disclosed in Japanese Utility Model Registration No. 3064403 is replaced with a fin (12a) to heat the neck from the outer side. Heat retained by the internal heating core is dissipated through the fin (12a) to achieve the balance between internal heating and external heating (see FIG. 4).

However, when using the method that supplies heat to the core (Japanese Utility Model Registration No. 3064403) or the method that promotes dissipation of heat from the core (JP-A-2006-297775), the neck crystallization temperature predominantly depends on the temperature of the heat source provided outside the neck (i.e., internal heating using the core is subsidiary). Japanese Utility Model Registration No. 3064403 focuses on the temperature gradient between the inner wall and the outer wall of the neck (see FIGS. 5 and 6), and JP-A-2006-297775 maintains the temperature between the inner wall and the outer wall of the neck constant by combining rapid external heating and heat dissipation using the fin (see paragraph 0058). However, Japanese Utility Model Registration No. 3064403 and JP-A-2006-297775 are silent about a change in temperature with time from room temperature to the crystallization temperature.

SUMMARY

The invention may provide a neck crystallization method that can reduce the crystallization time, and control the temperature of the neck at an optimum crystallization temperature (i.e., a temperature at which the neck is not overheated) while heating the inner side and the outer side of the neck.

According to one aspect of the invention, there is provided a preform neck crystallization method that crystallizes a neck of a preform that includes the neck, a body, and a bottom, the method comprising:

inserting a core into the neck;

heating the neck using a heater group disposed along a transfer direction while rotating the preform on its axis, and transferring the preform along the transfer direction in a state in which the core is inserted into the neck; and cooling the neck of the preform in a state in which the core is inserted into the neck, the heating of the neck including:

a first step that drives first heaters within the heater group at a first power, the first heaters being positioned on an upstream side in the transfer direction; and a second step that drives second heaters within the heater group at a second power that is lower than the first power until a temperature of the neck reaches a crystallization temperature zone, the second heaters being positioned on a downstream side of the first heaters.

According to one aspect of the invention, the crystallization time can be reduced while preventing a situation in which the neck is overheated to a temperature that exceeds the crystallization temperature zone by combining the rapid-heating first step and the slow-heating second step. When using only the first step, the crystallization time can be reduced, but the neck is overheated in the second half of the heating step. When using only the second step, the crystallization time can be controlled, but increases. Since the neck of the preform is at room temperature immediately after the preform has been supplied, the crystallization time can be reduced by rapidly heating the neck by the first step up to a temperature lower than the crystallization temperature zone.

The preform neck crystallization method may further comprise:

transferring the preform without heating between the first step and the second step.

The temperature of the neck of the preform decreases by transferring the preform without heating between the first step and the second step. Therefore, the effect of rapid heating in the first step can be suppressed (reduced) when starting the second step. This makes it possible to cause the temperature of the neck of the preform to rise less steeply as compared with the first step immediately after starting the second step.

The preform neck crystallization method may further comprise:

a third step that drives third heaters within the heater group at a third power that is lower than the second power to maintain the temperature of the neck within the crystallization temperature zone, the third heaters being positioned on a downstream side of the second heaters.

It is possible to easily maintain the temperature of the neck within the crystallization temperature zone by further reducing the heater power after the temperature of the neck has reached the crystallization temperature zone. This makes it possible to prevent a situation in which the neck is overheated.

In the preform neck crystallization method, the third step may include reducing the third power that drives the third heaters on a downstream side in the transfer direction compared to an upstream side in the transfer direction.

It is possible to maintain the temperature of the neck within the crystallization temperature zone by thus reducing the power on the downstream side to maintain or decrease the temperature increase rate.

The preform neck crystallization method may further comprise:

preheating the core before inserting the core into the neck.

This makes it possible to allow the temperature of the core to be substantially equal to the outer surface temperature of the neck (i.e., sufficiently reduce the difference in temperature between the inner side and the outer side of the neck) when staring the second step. The above configuration also has an advantage in that the time of the first step can be reduced.

According to another aspect of the invention, there is provided a wide-neck container that is made of a synthetic resin, and includes a neck, a body, and a bottom, the wide-neck container being configured so that a top side of the neck is sealed by a cap that is fitted to the neck, the neck including:

a neck tubular section;

an engagement section that is formed to protrude outward from the neck tubular section, and engages the cap; and a flange that is formed to protrude outward from the neck tubular section at the top side, a protrusion height of the flange from the neck tubular section being smaller than that of the engagement section, the top side of the neck including a first top side formed by the neck tubular section, and a second top side formed by the flange that is the same height level with the first top side and increases an area of the top side of the neck, a thickness of the flange being smaller than that of the neck tubular section, and the neck having been crystallized.

According to this aspect of the invention, the seal area can be increased by the top side having an increased area, and the resin density of the top side of the flange can be increased due to the resin pressure in the resin flow direction during injection molding. Therefore, deformation of the top side during crystallization is reduced, so that the seal-tightness with the cap can be improved. The flange may also be used as a member that engages a chuck that transfers the preform, and prevents displacement of the preform in the axial direction.

In the wide-neck container, the flange may have an opposite side that is opposite to the second top side, and the second top side may have a higher resin density than that of the opposite side.

Deformation of the top side of the flange used for sealing can be suppressed by thus allowing the opposite side having a low resin density to be deformed when crystallizing the neck.

According to another aspect of the invention, there is provided a wide-neck container that is made of a synthetic resin, and includes a neck, a body, and a bottom, the wide-neck container being configured so that a top side of the neck is sealed by a cap that is fitted to the neck, the neck including:

a neck tubular section;

an engagement section that is formed to protrude outward from the neck tubular section, and engages the cap; and a ring-shaped recess that is formed in the neck tubular section at a height position closer to the body than the engagement section.

According to this aspect of the invention, since the ring-shaped recess is formed to be depressed in the neck tubular section, the amount of resin used to form the preform can be reduced. Since the amount of shrinkage of the neck during crystallization can be reduced by reducing the volume of the neck, deformation of the top side of the neck can be suppressed, so that the top-side seal-tightness can be improved. The ring-shaped recess may also be used as a member that engages a chuck that transfers the preform, and prevents displacement of the preform in the axial direction.

In the wide-neck container according to each aspect, the engagement section may include N (N is an integer equal to or larger than 2) threads, and the N threads may be respectively provided in N segmented areas into which the neck tubular section is divided in a circumferential direction, and may be respectively formed in the N segmented areas within a range of less than 360°/N.

According to the above configuration, since each engagement section is provided in one row (i.e., two or more engagement sections are not arranged in the axial direction) around the neck tubular section, the volume of the engagement section that protrudes from the neck tubular section is reduced. Since the amount of shrinkage of the neck during crystallization can be reduced by reducing the volume of the neck, deformation of the top side of the neck can be suppressed, so that the top-side seal-tightness can be improved.

In the wide-neck container according to each aspect, each of the N threads may extend from a start point that is positioned at a first height in an axial direction of the neck tubular section to an end point that is positioned at a second height in the axial direction of the neck tubular section so that each of the N threads slopes upward toward the top side of the neck.

According to the above configuration, since the N threads are not connected spirally, but have the start point having an identical height and the end point having an identical height in the respective N segmented areas, the height of the neck tubular section can be reduced (i.e., the volume of the neck tubular section can be reduced). Since the amount of shrinkage of the neck during crystallization can also be reduced, deformation of the top side of the neck can be suppressed, so that the top-side seal-tightness can be improved.

BRIEF DESCRIPTION OF THE DRAWINGS

FIGS. 9A to 9D are views illustrating the main steps of a neck crystallization method.

DESCRIPTION OF EXEMPLARY EMBODIMENTS

Exemplary embodiments of the invention are described in detail below. Note that the following exemplary embodiments do not in any way limit the scope of the invention defined by the claims laid out herein. Note that all of the elements described in connection with the following exemplary embodiments should not necessarily be taken as essential elements of the invention.

1. First Embodiment

Figure 1:
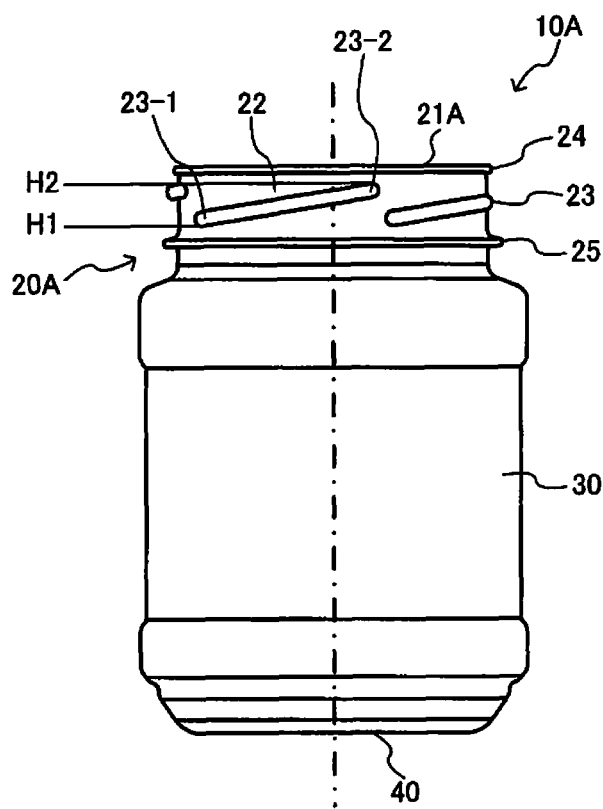
FIG. 1 is a front view illustrating a wide-neck container according to a first embodiment of the invention.
Figure 2:
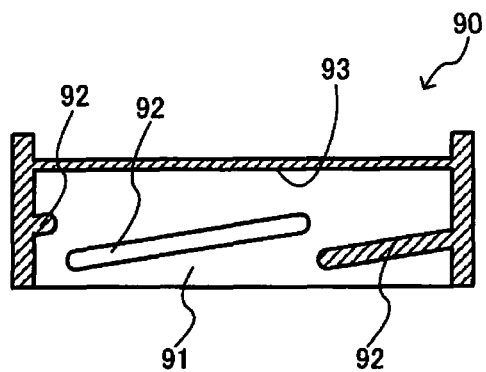
FIG. 2 is a cross-sectional view illustrating a cap that is fitted to the neck of the wide-neck container illustrated in FIG. 1.
Figure 3:
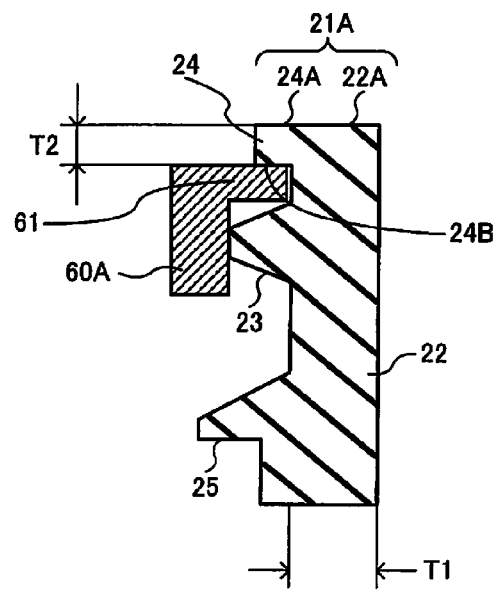
FIG. 3 is a cross-sectional view illustrating the neck of the wide-neck container illustrated in FIG. 1, and an example of a chuck that supports the neck.
Figure 4:
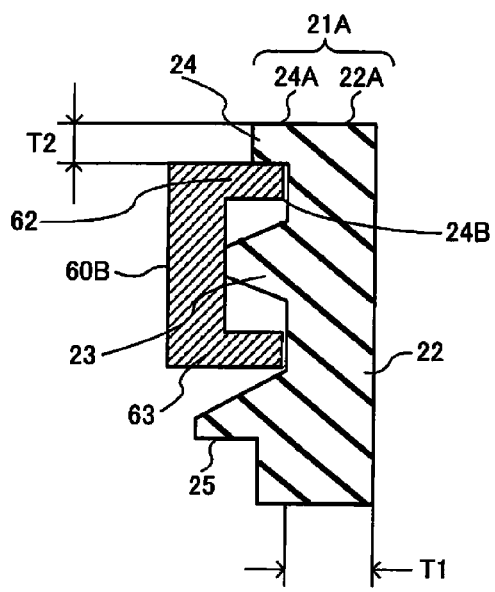
FIG. 4 is a cross-sectional view illustrating the neck of the wide-neck container illustrated in FIG. 1, and another example of a chuck that supports the neck.

FIG. 1 is a front view illustrating a wide-neck container according to a first embodiment of the invention, FIG. 2 is a cross-sectional view illustrating a cap that is fitted to the neck of the wide-neck container illustrated in FIG. 1, and FIGS. 3 and 4 are cross-sectional views illustrating the neck of the wide-neck container and a chuck that supports the neck. As illustrated in FIG. 1, a wide-neck container 10A made of a synthetic resin (e.g., polyethylene terephthalate) includes a neck 20A, a body 30, and a bottom 40. A top side 21A of the neck 20A is sealed by a cap 90 (see FIG. 2) that is fitted to the neck 20A.

A twist-off cap or a lug cap may be used as the cap 90 that is fitted to the neck 20A of the wide-neck container 10A, for example. The cap 90 is formed to have a bottomed tubular shape (see FIG. 2), and may include a plurality of (e.g., four) lugs 92 that protrude from an inner circumferential surface 91 of the tubular cap 90, and a seal section 93 that is positioned at the bottom of the cap 90. The seal section 93 may be formed to have a small thickness (see FIG. 2) so that the seal section 93 exhibits elasticity, or may be formed by bonding an elastic seal material.

The neck 20A includes a neck tubular section 22, and a plurality of engagement sections 23 that are formed to protrude outward from the neck tubular section 22, and respectively engage the plurality of lugs 92 of the cap 90. Each engagement section 23 may be formed by a thread, for example. The neck 20A also includes a flange 24 that is formed to protrude outward from the neck tubular section 22 at the top side 21A, the protrusion height of the flange 24 from the neck tubular section 22 being smaller than that of each engagement section 23. The neck 20A may further include a support ring (also referred to as "neck ring") 25. Note that the support ring 25 is not an essential element (described later).

The top side 21A of the neck 20A includes a first top side 22A of the neck tubular section 22, and a second top side 24A of the flange 24 that is the same height level with the first top side 22A and increases the area of the top side 21A. Note that the side (lower side) of the flange 24 opposite to the second top side 24A is referred to as an opposite side 24B. The thickness T2 of the flange 24 (i.e., the distance between the second top side 24A and the opposite side 24B) is smaller than the thickness T1 of the neck tubular section 22 (T1>T2). Note that the neck 20A has been crystallized (whitened). An example of the crystallization method is described later.

Since the neck 20A of the wide-neck container 10A does not require a locking ring (also referred to as "bead ring") that is required for a narrow-neck container, the total height of the neck 20A from the top side 21A to the lower side of the support ring 25 can be reduced to 15 mm or less, for example. This makes it possible to reduce the amount of resin used to produce a preform that is blow-molded into the container 10A. Since the amount of shrinkage of the neck 20A during crystallization (whitening) can be reduced by reducing the volume of the neck 20A, deformation of the top side 21A of the neck 20A can be suppressed. When a locking ring is provided to protrude from the neck tubular section 22, the locking ring easily shrinks during crystallization (whitening), and may cause deformation of the top side 21A. According to the first embodiment, it is possible to eliminate such an adverse effect of the locking ring.

Since the neck 20A of the wide-neck container 10A includes the flange 24 at the top side 21A, the top-side seal-tightness is improved. The top-side seal-tightness depends on the flatness and the area of the top side. According to the first embodiment, both the flatness and the area of the top side are improved (or increased) for the following reasons.

Specifically, the top side 21A includes the first top side 22A of the neck tubular section 22, and the second top side 24A of the flange 24 that is the same height level with the first top side 22A and increases the area of the top side 21A. Therefore, when the cap 90 illustrated in FIG. 2 is fitted to the neck 20A, the seal area is increased due to the top side 21A that is enlarged by the second top side 24A, so that the seal-tightness with the seal section 93 of the cap 90 can be improved. This is the first reason why the top-side seal-tightness is improved.

Figure 5:
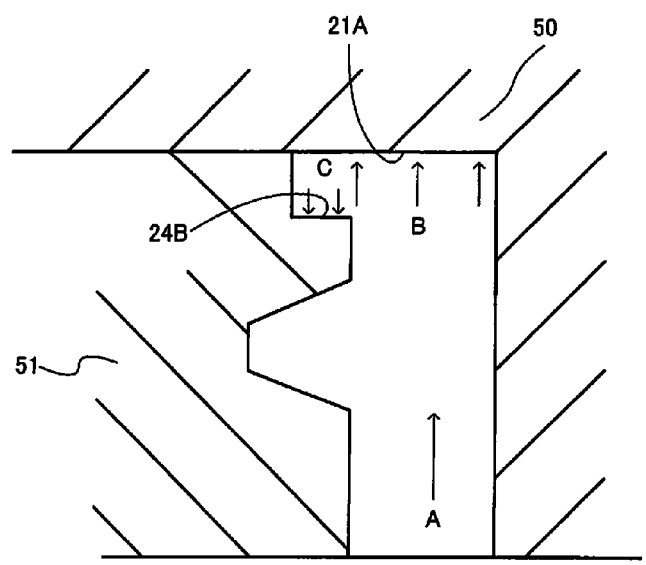
FIG. 5 is a cross-sectional view illustrating a preform injection molding step employed for the wide-neck container illustrated in FIG. 1.

The flange 24 increases the density of the resin that forms the top side 21A, and reduces deformation of the top side 21A. FIG. 5 illustrates a process that injection-molds the neck 20A by injecting a resin into a cavity formed between an injection core mold 50 and a neck cavity mold 51. The resin is injected at a given resin pressure from the bottom side of a preform for blow-molding the container 10A along a resin flow direction A indicated by an arrow A. In this case, while a resin pressure B is applied directly to the molding surface for the wide top side 21A along the resin flow direction A, a resin pressure C is applied to the molding surface for the narrow opposite side 24B in the direction opposite to the resin flow direction A. Therefore, the resin pressure C is lower than the resin pressure B.

Since the top side 21A comes in contact with the injection core mold 50 over a wide area, the top side 21A is cooled with high cooling efficiency. In contrast, since the opposite side 24B is narrow, and is cooled in a state in which the opposite side 24B comes in contact with the protrusion of the neck cavity mold 51, the opposite side 24B is cooled with low cooling efficiency.

Accordingly, the second top side 24A (top side 21A) has a higher resin density than that of the opposite side 24B. The resin density further increases as a result of crystallizing the neck 20A. The second top side 24A (top side 21A) still has a higher resin density than that of the opposite side 24B after crystallizing the neck 20A. The top side 21A rarely shrinks, and exhibits improved flatness due to an increase in resin density. If the resin density is low in an amorphous state before crystallization, a large amount of shrinkage occurs during the heat treatment. According to the first embodiment, shrinkage (deformation) of the second top side 24A (top side 21A) is reliably suppressed while allowing the opposite side 24B to shrink (deform) to some extent. This is the second reason why the top-side seal-tightness is improved.

The flange 24 also serves as a member that prevents displacement of a chuck member 60A or 60B (see FIG. 3 or 4) in the axial direction. The wide-neck container 10A or the preform is supported in an upright state (i.e., a state in which the neck 20A faces upward) by supporting the lower side of the support ring 25 when transferring the wide-neck container 10A or the preform without using the neck cavity mold, and is otherwise supported using the chuck member 60A illustrated in FIG. 3 or the chuck member 60B illustrated in FIG. 4. The chuck member 60 holds the engagement sections (threads) 23 from either side. The chuck member 60 may include a protrusion 61 that enters the space between the engagement section (thread) 23 and the flange 24 in order to prevent displacement of the container 10A in the axial direction. According to the example illustrated in FIG. 3, the support ring 25 can be made unnecessary by transferring the container 10A in an upright state while supporting the flange 24 instead of the support ring 25, or transferring the container 10A in an inverted state. The chuck member 60B illustrated in FIG. 4 may include a protrusion 62 that comes in contact with the flange 24, and a protrusion 63 that comes in contact with the support ring 25 in order to prevent displacement of the container 10A in the axial direction.

2. Second Embodiment

Figure 6:
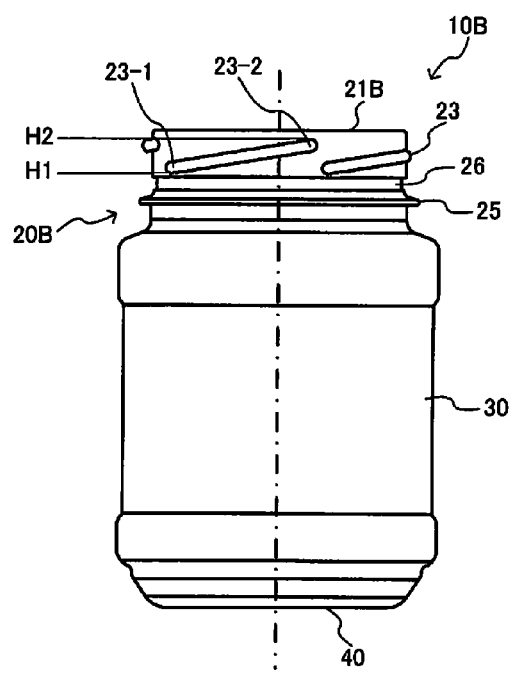
FIG. 6 is a front view illustrating a wide-neck container according to a second embodiment of the invention.
Figure 7:
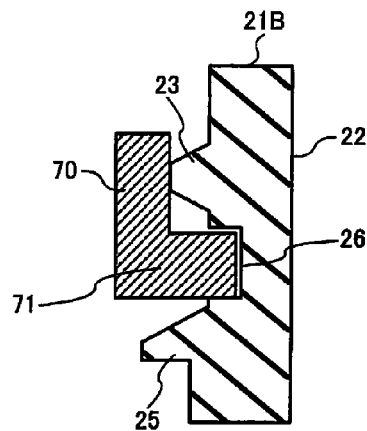
FIG. 7 is a cross-sectional view illustrating the neck of the wide-neck container illustrated in FIG. 6.

FIG. 6 is a front view illustrating a wide-neck container according to a second embodiment of the invention, and FIG. 7 is a cross-sectional view illustrating the neck of the wide-neck container illustrated in FIG. 6. As illustrated in FIG. 6, a wide-neck container 10B made of a synthetic resin includes a neck 20B, a body 30, and a bottom 40. A top side 21B of the neck 20B is sealed by the cap 90 (see FIG. 2) that is fitted to the neck 20B. The neck 20B includes the neck tubular section 22, the engagement sections (threads) 23, and the support ring 25 in the same manner as in the first embodiment, but does not include the flange 24. Note that the neck 20B may also include the flange 24. The neck 20B includes a ring-shaped recess 6 that is formed in the neck tubular section 22 at a height position closer to the body 30 than the engagement sections 23. Note that the support ring 25 is not an essential element in the same manner as in the first embodiment.

The neck 20B of the wide-neck container 10B does not require a locking ring that is required for a narrow-neck container, and includes the ring-shaped recess 26 that can be reduced in vertical dimension as compared with (the height of) a locking ring. This makes it possible to reduce the total height of the neck 20B from the top side 21B to the lower side of the support ring 25, and reduce the amount of resin used to form a preform for blow-molding the container 10B. Since the amount of shrinkage of the neck 20B during crystallization (whitening) can be reduced by reducing the volume of the neck 20B, deformation of the top side 21B of the neck 20B can be suppressed. When a locking ring is provided to protrude from the neck tubular section 22, the locking ring easily shrinks during crystallization (whitening), and may cause deformation of the top side 21B. According to the second embodiment, since the ring-shaped recess 26 is formed in the neck tubular section 22, it is possible to suppress such an adverse effect of shrinkage.

The ring-shaped recess 26 also serves as an engagement section that engages a chuck member 70 (see FIG. 4). The wide-neck container 10B or the preform is supported in an upright state (i.e., a state in which the neck 20B faces upward) by supporting the lower side of the support ring 25 when transferring the wide-neck container 10B or the preform without using the neck cavity mold, and is otherwise supported using the chuck member 70. The chuck member 70 holds the engagement sections (threads) 23 from either side. The chuck member 70 may include a protrusion 71 that enters the ring-shaped recess 26 in order to prevent displacement of the container 10B in the axial direction. The support ring 25 can be made unnecessary by transferring the container 10B in an inverted state instead of transferring the container 10B in an upright state.

3. Thread Shape that Suppresses Deformation of Top Side of Neck

Figure 8:
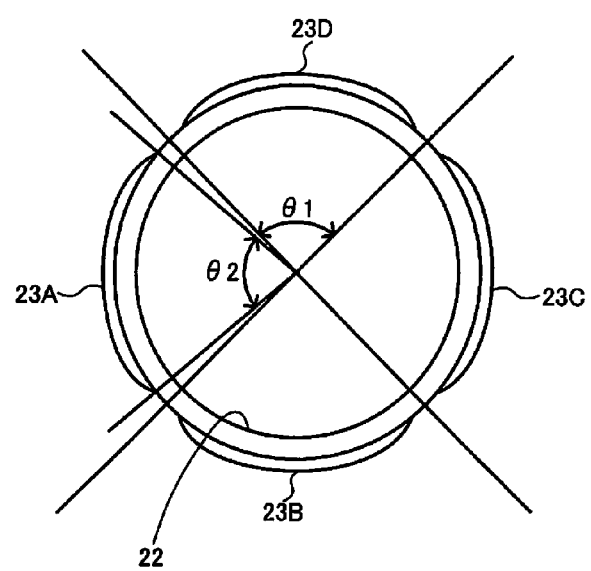
FIG. 8 is an end view illustrating threads of the wide-neck containers illustrated in FIGS. 1 and 6.

FIG. 8 is an end view (from the top side 21A or 21B) illustrating the engagement sections (threads) 23 of the container 10A or 10B illustrated in FIG. 1 or 6. Note that the flange 24 (see FIG. 1) is omitted in FIG. 8.

In the first embodiment and the second embodiment, the engagement sections 23 include N (N is an integer equal to or larger than 2 (preferably 4<N<6) (N=4 in the first embodiment and the second embodiment) threads 23A to 23D (three threads are illustrated in FIGS. 1 and 6) (see FIGS. 1, 6, and 8). The N (=4) threads 23A to 23D are respectively provided in N segmented areas into which the neck tubular section 22 is divided in the circumferential direction ($\theta1=90°$), the threads 23A to 23D being respectively formed in the N segmented areas within an angle $\theta2$ of less than $360°/N$. When N=4, the threads 23A to 23D are respectively formed within an angular range of less than 90° ($\theta2<90°$). Each of the N (=4) threads 23A to 23D extends from a start point 23-1 that is positioned at a first height H1 in the axial direction of the neck tubular section 22 to an end point 23-2 that is positioned at a second height H2 in the axial direction of the neck tubular section 22 (i.e., each of the N (=4) threads 23A to 23D slopes upward toward the top side 21A (21B) of the neck 20A (20B)).

When fitting the cap 90 illustrated in FIG. 2 to the neck 20A (20B) that includes the multiple threads 23A to 23D, the four lugs 92 of the cap 90 are fitted to the multiple (four to six) threads 23A to 23D. For example, the wide-neck container 10A (10B) can be opened or closed by turning the cap 90 by ¼th to ⅙th of a turn.

Since the engagement sections (threads) 23 of the container 10A or 10B (see FIG. 1 or 6) are formed to protrude from the neck tubular section 22, shrinkage of the engagement sections (threads) 23 adversely affects the top side 21A (21B) during heat treatment for crystallization as the volume of the engagement sections (threads) 23 increases.

In the first embodiment and the second embodiment, the engagement sections (threads) 23 are formed so that the four threads 23A to 23D are respectively provided in the N segmented areas into which the neck tubular section 22 is divided in the circumferential direction ($\theta1=90°$). Therefore, the volume of the engagement sections (threads) 23 is sufficiently small as compared with the case where two or more threads are arranged in the axial direction of the neck tubular section 22, so that deformation of the top side 21A (21B) can be suppressed.

In the first embodiment and the second embodiment, the engagement sections (threads) 23 are formed so that the four threads 23A to 23D are respectively formed within an angular range of less than 90° (θ2<90°). Specifically, a clearance is necessarily formed between adjacent threads among the four threads 23A to 23D that are not continuously formed in the circumferential direction. This makes it possible to further reduce the volume of the engagement sections (threads) 23, and suppress deformation of the top side 21A (21B).

The engagement sections (threads) 23 have the following advantageous effect on the wide-neck container 10B according to the second embodiment. As illustrated in FIG. 7, the protrusion 71 of the chuck member 70 is fitted into the ring-shaped recess 26 of the neck 20B, and prevents a situation in which the neck 20B held by the chuck member 70 falls.

The depth of the ring-shaped recess 26 is limited to an upper-limit value taking account of the thickness of the neck tubular section 22. If the depth of the ring-shaped recess 26 exceeds the upper-limit value, the flow of a resin that forms the neck tubular section 22 may be hindered in an area of the ring-shaped recess 26 when injection-molding a preform, so that a short shot or the like may occur. The thickness of the neck tubular section 22 is also limited from the viewpoint of reducing the amount of resin. For example, when the thickness of the neck tubular section 22 is set to 1.5 mm, the upper-limit value of the depth of the ring-shaped recess 26 is 0.5 mm. As a result, the chuck member 70 illustrated in FIG. 7 may be removed from the ring-shaped recess 26 due to the weight of the preform, for example.

According to the first embodiment and the second embodiment, each of the N (=4) threads 23A to 23D extends from the start point 23-1 that is positioned at the first height H1 in the axial direction of the neck tubular section 22 to the end point 23-2 that is positioned at the second height H2 in the axial direction of the neck tubular section 22 (i.e., each of the N (=4) threads 23A to 23D slopes upward toward the top side 21A (21B) of the neck 20A (20B)). More specifically, the four threads 23A to 23D respectively include the start point 23-1 that is positioned at the first height H1 directly above the ring-shaped recess 26 at different positions in the circumferential direction of the neck tubular section 22.

Therefore, even if the chuck member 70 illustrated in FIG. 7 has been removed from the ring-shaped recess 26, the four start points 23-1 that protrude at the first height position H1 at four points in the circumferential direction of the neck tubular section 22 are caught by the protrusion 71 of the chuck member 70. This makes it possible to prevent a situation in which the neck 20B falls off from the chuck member 70. Each start point 23-1 thus functions as a stopper.

4. Neck Crystallization Method

Figure 10:
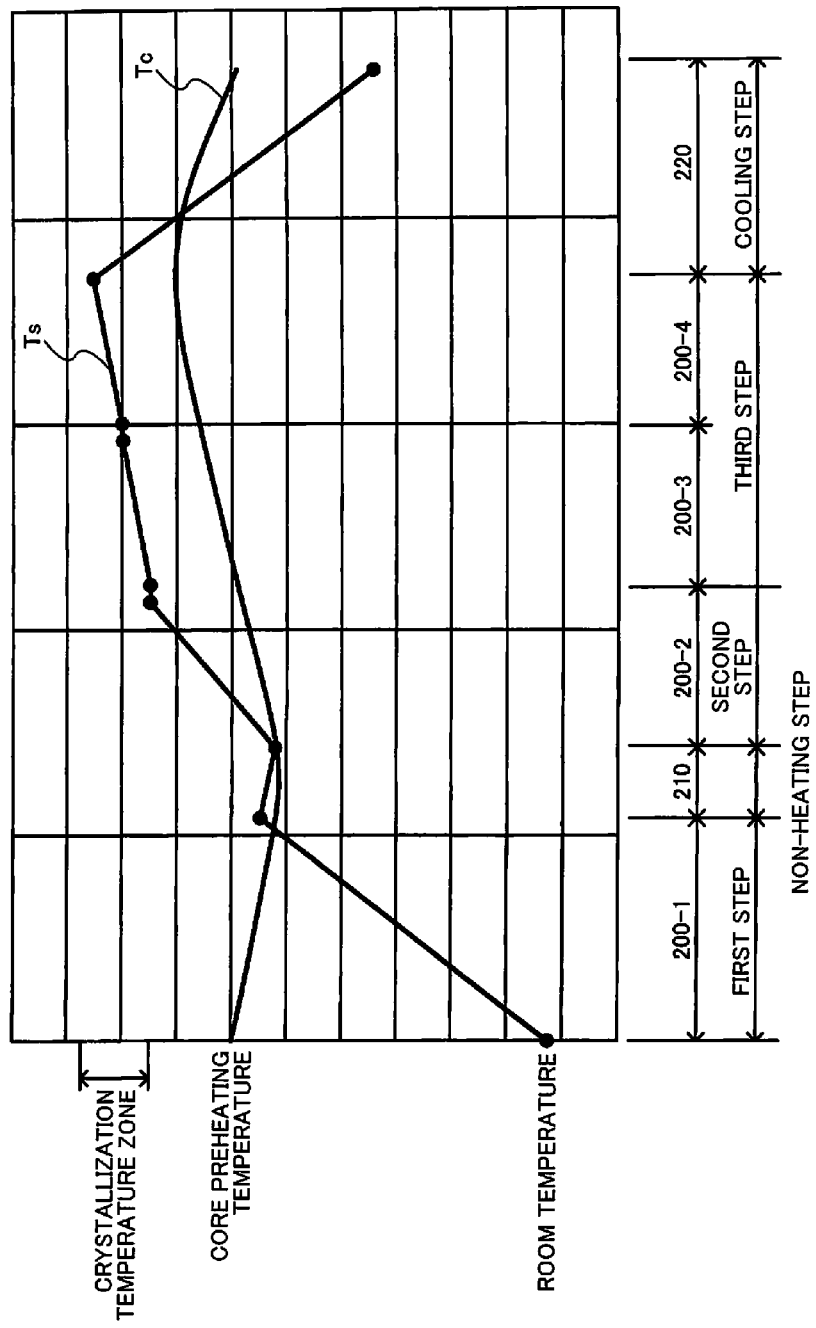
FIG. 10 is a characteristic diagram illustrating a change in surface temperature of a neck and a change in temperature of a core within one cycle.

A neck crystallization method that may be applied to the wide-neck container 10A (10B) according to the first embodiment or the second embodiment, and may also be applied to another wide-neck container or a narrow-neck container, is described below. FIGS. 9A to 9D are views illustrating the main steps of the neck crystallization method, and FIG. 10 is a characteristic diagram illustrating a change in surface temperature of the neck and a change in temperature of the core within one cycle.

A preform 100 (e.g., wide-neck container preform) that has been injection-molded is transferred to a neck crystallization system (see FIG. 9A). Note that the neck crystallization system may be used to crystallize the neck of a blow-molded container instead of crystallizing the neck of a preform. In this case, however, it is necessary to use a larger system in order to transfer a container that is larger than a preform.

The preform 100 includes a neck 101, a body 102, and a bottom 103. The neck 101 of the preform 100 that is not blow-molded may have the structure of the neck 20A illustrated in FIG. 1, the structure of the neck 20B illustrated in FIG. 6, or another neck structure.

FIG. 9A illustrates a step that inserts a core 110 into the neck 101 of the preform 100. The preform 100 is transferred while being placed on a tubular body 120 in an inverted state before the core 110 is inserted into the neck 101 of the preform 100. The core 110 is secured on an elevating rod 130, and a pad 132 is secured on the upper end of the elevating rod 130. FIG. 9A illustrates a state in which the core 110 is disposed inside the neck 101 of the preform 100, and the preform 100 is slightly moved upward by the pad 132, and is separated from the tubular body 120 by moving the elevating rod 130 upward.

The core 110 is formed by disposing an outer layer 114 that is formed of a material having either or both of an infrared absorption function and an infrared reflection function on the circumferential surface of an insulator 112. The outer layer 114 is formed of a metal, for example. In one embodiment of the invention, the outer layer 114 is formed of aluminum (Al). The core 110 does not have a heat source, and heats the neck 101 from the inner side by reflecting infrared radiation from a heater (e.g., infrared heater 140) (described later), or utilizing heat retained by the core 110. The difference in temperature between the inner side and the outer side of the neck 101 can be reduced while reducing the crystallization time by combining internal heating using the core 110 and external heating using the infrared heater 140. Moreover, since the core 110 that is transferred together with the preform 100 need not have a heat source, it is unnecessary to use a complex system.

The core 110 may include a heat shield plate 116 that is provided on the upper side of the core 110 and blocks (e.g., reflects) heat. A situation in which heat is transmitted to the body 102 can be prevented by providing the heat shield plate 116.

FIG. 9B illustrates a heating step. In FIG. 9B, the neck 101 is heated using the infrared heater 140 while rotating the preform 100 on its axis, and transferring the preform 100 along the transfer direction in a state in which the core 110 is inserted into the neck 101. A plurality of infrared heaters 140 (hereinafter referred to as "infrared heater group 200") are provided along preform transfer directions A1 and A2 illustrated in FIG. 11. FIG. 9B illustrates a state in which the infrared heaters 140 are disposed opposite to each other on either side of the transfer path, and uniformly heat the neck 101 of the rotating preform 100 from the outside. In the heating step, the body 102 of the preform 100 may be shielded from heat from the infrared heater 130 by disposing a heat shield tubular body 150 around the body 102 (see FIG. 9B).

FIG. 9C illustrates a step that cools the neck 101 of the preform 100 in a state in which the core 110 is inserted into the neck 101. The cooling step may be implemented by air cooling while rotating the preform 100, or may be implemented by forced cooling using a refrigerant. The core 110 prevents (restricts) shrinkage (deformation) of the neck 101 during the cooling step.

FIG. 9D illustrates a step that removes the core 110 from the neck 101 of the preform 100. The preform 100, of which the neck has been crystallized, is removed from the tubular body 120 to complete one cycle of the neck crystallization method.

Figure 11:
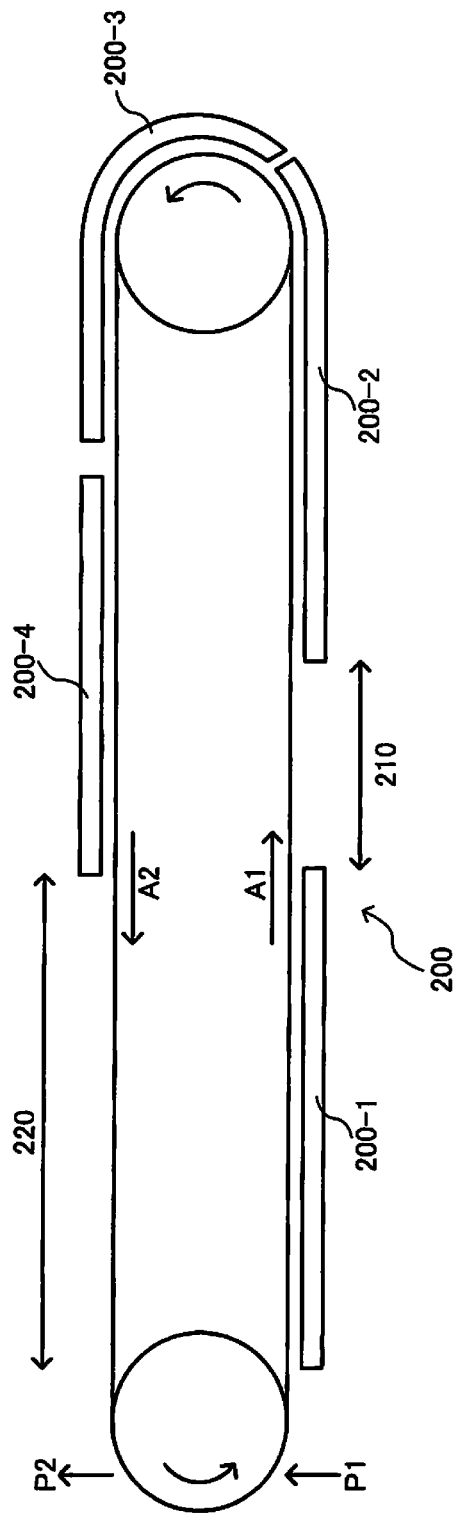
FIG. 11 is a plan view schematically illustrating a neck crystallization system.

The heating step is described below with reference to FIGS. 10 and 11. FIG. 11 is a plan view schematically illustrating the transfer path of the preform 100 and the infrared heater group 200. The preform is supplied at a position P1, continuously or intermittently transferred and heated along the transfer directions A1 and A2, and cooled in a cooling zone 220. The preform 100, of which the neck has been crystallized, is removed at a position P2.

The heating step includes a first step that drives first infrared heaters 200-1 within the infrared heater group 200 illustrated in FIG. 11 at a first power, the first infrared heaters 200-1 being positioned on the upstream side in the transfer direction. In the first step illustrated in FIG. 10, the first power that drives the first infrared heaters 200-1 is set to 70% of full power, for example. The surface temperature TS of the neck 101 of the preform 100 (see FIG. 10) increases relatively steeply per unit time.

The heating step may further include a second step that drives second infrared heaters 200-2 within the infrared heater group 200 illustrated in FIG. 11 that are positioned on the downstream side of the first infrared heaters 200-1 at a second power that is lower than the first power, and heats the neck 101 using the second infrared heaters 200-2 and the core 110 until the temperature of the neck 101 reaches a crystallization (whitening) temperature zone (e.g., 170 to 190° C.). In the second step illustrated in FIG. 10, the second power that drives the second infrared heaters 200-2 is set to 60% of full power, for example. The surface temperature TS of the neck 101 of the preform 100 (see FIG. 10) increases less steeply per unit time as compared with the first step.

The rapid-heating first step and the slow-heating second step are combined in order to reduce the crystallization time while preventing a situation in which the neck 101 is overheated. When using only the first step, the crystallization time can be reduced, but the neck 101 is overheated in the second half of the heating step. When using only the second step, the crystallization temperature can be controlled, but the crystallization time increases. Since the neck 101 of the preform 100 is at room temperature immediately after the preform 100 has been supplied, the crystallization time can be reduced by rapidly heating the neck 101 by the first step up to a temperature lower than the crystallization temperature zone.

As illustrated in FIG. 10, a step that transfers the preform without heating may be provided between the first step and the second step. In FIG. 11, a non-heating zone 210 in which heaters are not provided, or heaters that are not driven are disposed, is provided between the first heaters 200-1 and the second heaters 200-2. The surface temperature TS of the neck 101 of the preform 100 decreases due to the non-heating zone 210 (see FIG. 10). Therefore, the effect of rapid heating in the first step can be suppressed (reduced) when starting the second step. This makes it possible to cause the surface temperature TS of the neck 101 of the preform 100 to increase less steeply as compared with the first step when starting the second step.

The heating step may further include a third step that drives third infrared heaters 200-3 and 200-4 within the infrared heater group 200 illustrated in FIG. 11 that are positioned on the downstream side of the second infrared heaters 200-2 at a third power that is lower than the second power, and heats the neck 101 using the infrared heaters 200-3 and 200-4 and the core 110 while maintaining the temperature of the neck 101 within the crystallization (whitening) temperature zone. In the third step illustrated in FIG. 10, the third power that drives the third infrared heaters 200-3 and 200-4 is set to 50 to 55% of full power, for example. It is possible to easily maintain the temperature of the neck 101 within the crystallization temperature zone by further reducing the heater power after the temperature of the neck 101 has reached the crystallization temperature zone. This makes it possible to prevent a situation in which the neck 101 is overheated.

In the third step, the third power that drives the third infrared heaters 200-3 and 200-4 (see FIG. 11) may be reduced on the downstream side in the transfer direction as compared to the upstream side in the transfer direction. In the example illustrated in FIG. 10, the power that drives the upstream-side third infrared heaters 200-3 is set to 55% of full power, and the power that drives the downstream-side third infrared heaters 200-4 is set to 50% of full power. It is possible to maintain the temperature of the neck 101 within the crystallization temperature zone by reducing the power on the downstream side in the transfer direction to maintain the temperature increase rate (see FIG. 10), or decrease the temperature increase rate. This makes it possible to prevent a situation in which the neck 101 is overheated in the third step. In the third step, the third infrared heaters may be divided into three or more groups instead of dividing the third infrared heaters into the groups 200-3 and 200-4.

When the time in which a plurality of preforms 100 pass by the infrared heaters 200-1 is referred to as T1, and the time in which a plurality of preforms 100 pass by each of the infrared heaters 200-2 to 200-4 is referred to as T2, T1>T2 may be satisfied. When a plurality of preforms 100 are continuously transferred, for example, the difference between the time T1 and the time T2 corresponds to the difference in length between the heating zones. In FIG. 11, the heating zones corresponding to the infrared heaters 200-1 to 200-4 have an identical length. The heating time in each heating zone can be changed by changing the length of each heating zone. When intermittently transferring a plurality of preforms 100, the heating time in each heating zone can also be changed by changing the length of each heating zone. For example, when the time T1 corresponds to three steps of continuous transfer, the time T2 may be set to two steps of continuous transfer. It is unnecessary to use an infrared heater that achieves a very high temperature rise rate when increasing the temperature of the neck 101 from room temperature to a temperature that exceeds 100° C. by increasing the time T1 of the first step. If the time T1 of the first step is shorter than the time T2, the second step may be adversely affected by rapid heating in the first step, so that it may be difficult to maintain the temperature of the neck 101 within the crystallization temperature zone, or it may take time until the temperature of the neck 101 reaches the crystallization temperature zone.

The temperature TC of the core 110 is also illustrated in FIG. 11. FIG. 11 illustrates an example in which the core 110 is preheated at a position between the positions P1 and P2 before the core 110 is inserted into the neck 101. Specifically, the neck crystallization method may further include a step that preheats the core 110 before inserting the core 110 into the neck 101.

In the first step (see FIG. 11), infrared radiation from the infrared heater 140 is applied to the core 110 via the neck 101, but the temperature of the core 110 decreases due to contact with the neck 101 that is set at room temperature. In the first step or the subsequent non-heating step (at the start timing of the second step), the temperature of the core 110 is substantially equal to the surface temperature of the neck 101. Specifically, the first step or the subsequent non-heating step is performed until the temperature of the outer side of the neck 101 becomes substantially equal to the temperature of the inner side of the neck 101. In the second step, the temperature increase rate of the core 110 is low since the core 110 has a larger heat capacity than the neck 101. However, since the temperature TC of the core 110 gradually increases along with an increase in the surface temperature TS of the neck 101 of the preform 100, the difference in temperature between the inner side and the outer side of the neck 101 is within a given range. Note that the step that preheats the core 110 is not an essential step, but has an advantage in that the time of the first step can be reduced by preheating the core 110.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A preform neck crystallization method that crystallizes a neck of a preform that includes the neck, a body, and a bottom, the method comprising:
    inserting a core into the neck;
    heating the neck using a heater group disposed along a transfer direction while rotating the preform on its axis, and transferring the preform along the transfer direction in a state in which the core is inserted into the neck; and
    cooling the neck of the preform in a state in which the core is inserted into the neck,
    the heating of the neck including:
    a first step that drives first heaters within the heater group at a first power to heat the neck to a temperature lower than a crystallization temperature zone, the first heaters being positioned on an upstream side in the transfer direction; and
    a second step that drives second heaters within the heater group at a second power that is lower than the first power until a temperature of the neck reaches a crystallization temperature zone, the second heaters being positioned on a downstream side of the first heaters.

2. A preform neck crystallization method that crystallizes a neck of a preform that includes the neck, a body, and a bottom, the method comprising:
    inserting a core into the neck;
    heating the neck using a heater group disposed along a transfer direction while rotating the preform on its axis, and transferring the preform along the transfer direction in a state in which the core is inserted into the neck; and
    cooling the neck of the preform in a state in which the core is inserted into the neck,
    the heating of the neck including:
    a first step that drives first heaters within the heater group at a first power, the first heaters being positioned on an upstream side in the transfer direction;
    a second step that drives second heaters within the heater group at a second power that is lower than the first power until a temperature of the neck reaches a crystallization temperature zone, the second heaters being positioned on a downstream side of the first heaters; and
    a step that is provided between the first step and the second step, and transfers the preform without heating.

3. The preform neck crystallization method as defined in claim 1, further comprising:
    a third step that drives third heaters within the heater group at a third power that is lower than the second power to maintain the temperature of the neck within the crystallization temperature zone, the third heaters being positioned on a downstream side of the second heaters.

4. The preform neck crystallization method as defined in claim 3,
    the third step including reducing the third power that drives the third heaters on a downstream side in the transfer direction compared to an upstream side in the transfer direction.

5. The preform neck crystallization method as defined in claim 1, further comprising:
    preheating the core before inserting the core into the neck.

6. The preform neck crystallization method as defined in claim 1,
    the preform being used to mold a wide-neck container that is configured so that a top side of the neck is sealed by a cap that is fitted to the neck,
    the neck including:
    a neck tubular section;
    an engagement section that is formed to protrude outward from the neck tubular section, and engages the cap; and
    a flange that is formed to protrude outward from the neck tubular section at the top side, a protrusion height of the flange from the neck tubular section being smaller than that of the engagement section,
    the top side of the neck including a first top side formed by the neck tubular section, and a second top side formed by the flange that is the same height level with the first top side and increases an area of the top side of neck, and
    a thickness of the flange being smaller than that of the neck tubular section.

7. The preform neck crystallization method as defined in claim 6,
    the flange having an opposite side that is opposite to the second top side, and the second top side having a higher resin density than that of the opposite side.

8. The preform neck crystallization method as defined in claim 1,
    the preform being used to mold a wide-neck container that is configured so that a top side of the neck is sealed by a cap that is fitted to the neck,
    the neck including:
    a neck tubular section;
    an engagement section that is formed to protrude outward from the neck tubular section, and engages the cap; and
    a ring-shaped recess that is formed in the neck tubular section at a height position closer to the body than the engagement section.

9. The preform neck crystallization method as defined in claim 6,
    the engagement section including N (N is an integer equal to or larger than 2) threads, the N threads being respectively provided in N segmented areas into which the neck tubular section is divided in a circumferential direction, and being respectively formed in the N segmented areas within a range of less than 360°/N.

10. The preform neck crystallization method as defined in claim 9,
    each of the N threads extending from a start point that is positioned at a first height in an axial direction of the neck tubular section to an end point that is positioned at a second height in the axial direction of the neck tubular section so that each of the N threads slopes upward toward the top side of the neck.

* * * * *